(12) United States Patent
Chou et al.

(10) Patent No.: US 9,172,631 B2
(45) Date of Patent: Oct. 27, 2015

(54) LINK PATH DISCOVERY

(75) Inventors: Koutoung Chou, Plano, TX (US);
Maria Malit, Frisco, TX (US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 1508 days.

(21) Appl. No.: 12/632,004

(22) Filed: Dec. 7, 2009

(65) Prior Publication Data

US 2011/0134929 A1     Jun. 9, 2011

(51) Int. Cl.
*H04L 12/28* (2006.01)
*H04L 12/751* (2013.01)
*H04J 1/16* (2006.01)
*H04L 12/721* (2013.01)
*H04L 12/723* (2013.01)

(52) U.S. Cl.
CPC ............... *H04L 45/02* (2013.01); *H04L 45/123* (2013.01); *H04L 45/50* (2013.01)

(58) Field of Classification Search
CPC .... H04L 29/06; H04L 45/00; H04L 29/06027
USPC .................................. 370/238, 252, 254, 389
See application file for complete search history.

(56) References Cited

U.S. PATENT DOCUMENTS

| | | | | |
|---|---|---|---|---|
| 5,317,566 A * | 5/1994 | Joshi | ............................. | 370/238 |
| 5,600,825 A * | 2/1997 | Atkins et al. | ................... | 345/684 |
| 7,616,576 B2 * | 11/2009 | Li et al. | .......................... | 370/238 |
| 8,203,972 B2 * | 6/2012 | Sauermann | .................... | 370/256 |
| 8,750,158 B2 * | 6/2014 | Morrill et al. | ................... | 370/253 |
| 2003/0118027 A1 * | 6/2003 | Lee et al. | ................. | 370/395.21 |
| 2003/0137974 A1 * | 7/2003 | Kwan et al. | .................... | 370/352 |
| 2005/0078656 A1 * | 4/2005 | Bryant et al. | ................. | 370/351 |
| 2006/0046645 A1 * | 3/2006 | Ogilvie | ......................... | 455/11.1 |
| 2009/0168664 A1 * | 7/2009 | Washburn | ..................... | 370/254 |
| 2013/0077473 A1 * | 3/2013 | Ojha et al. | ..................... | 370/221 |

* cited by examiner

*Primary Examiner* — John Pezzlo

(57) ABSTRACT

A method includes identifying, by a first router, a number of label switched paths from the first router to a destination router, wherein each of the label switched paths includes less than a predetermined number of routers. The method may also include storing, for each of the label switched paths, information identifying each router in the label switched path. The method may further include identifying a least cost label switched path based on the stored information.

20 Claims, 7 Drawing Sheets

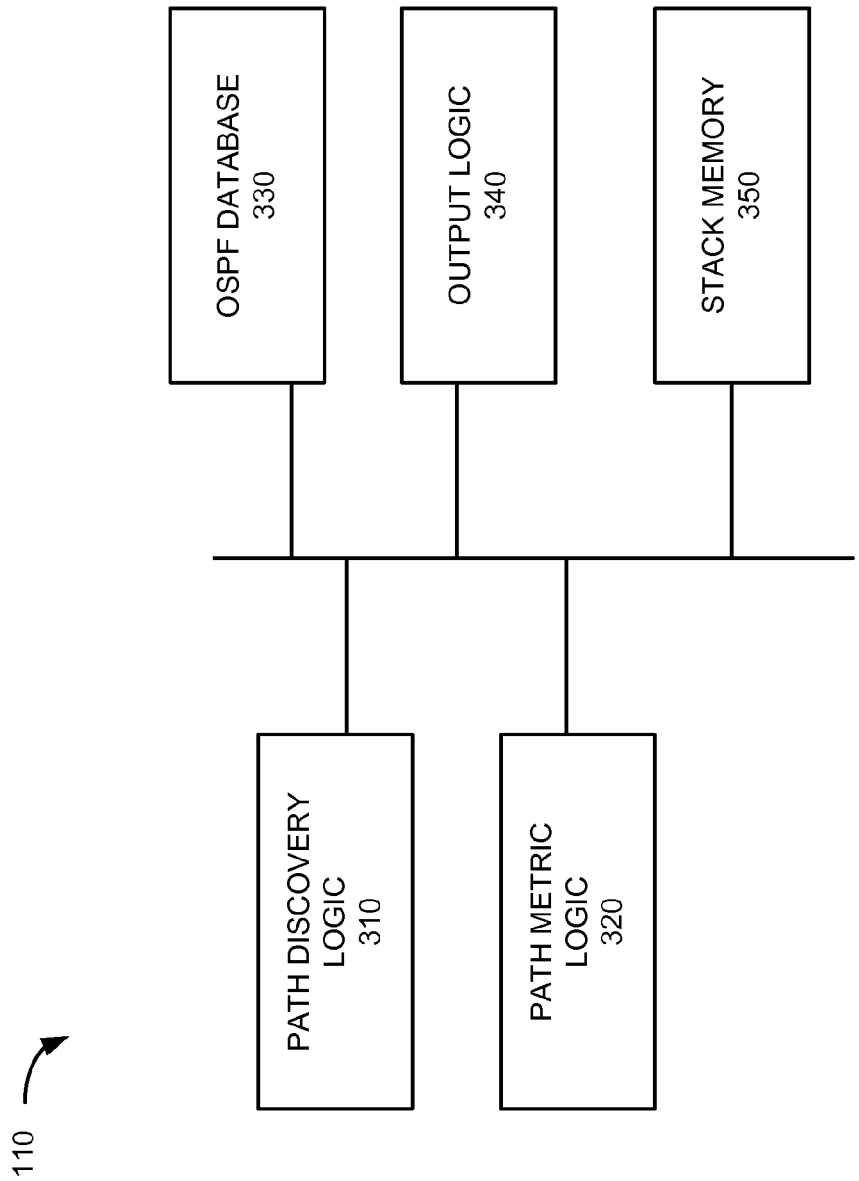

LINK PATH DISCOVERY

BACKGROUND INFORMATION

Multiprotocol Label Switching (MPLS) is a label based switching and forwarding protocol that often results in a very fast lookup of a forwarding table. For example, in an MPLS network, a label is affixed to packets in a customer's traffic. A receiving router or other network device uses the label to make a forwarding decision.

Routers within an MPLS network, such as Label Switched Routers (LSRs), may exchange labels using the Label Distribution Protocol (LDP) and may make forwarding decision in accordance with the Interior Gateway Protocol (IGP). In a large MPLS network, a label switched path (LSP) may be created using the IGP and label information. In scenarios where LDP is used, label information is exchanged between neighboring LSRs. However, these labels are not distributed to other routers in the network. Therefore, the labels are only locally significant to the router that receives and/or sends the label.

In a network that includes multiple hops or segments from the ingress LSR to the egress LSR of the LSP, a broken LSP can present a significant troubleshooting task to an engineer. For example, the engineer must check the routing table and label forwarding table at the ingress and egress LSRs and any LSRs in between. Depending on the size and design of the network, this troubleshooting task can be time consuming and susceptible to errors.

BRIEF DESCRIPTION OF THE DRAWINGS

FIG. 3 illustrates an exemplary configuration of logic components implemented in one of the network devices of FIG. 1;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein provide for identifying one or more paths in a network. In one implementation, a first router may execute a script or program to identify one or more paths from the first router to a destination router by accessing topology information stored in the first router. One or more paths may be traced back from the destination router to the first router. In addition, the first router may also access stored metric information to select one of the plurality of paths in the network.

Figure 1:
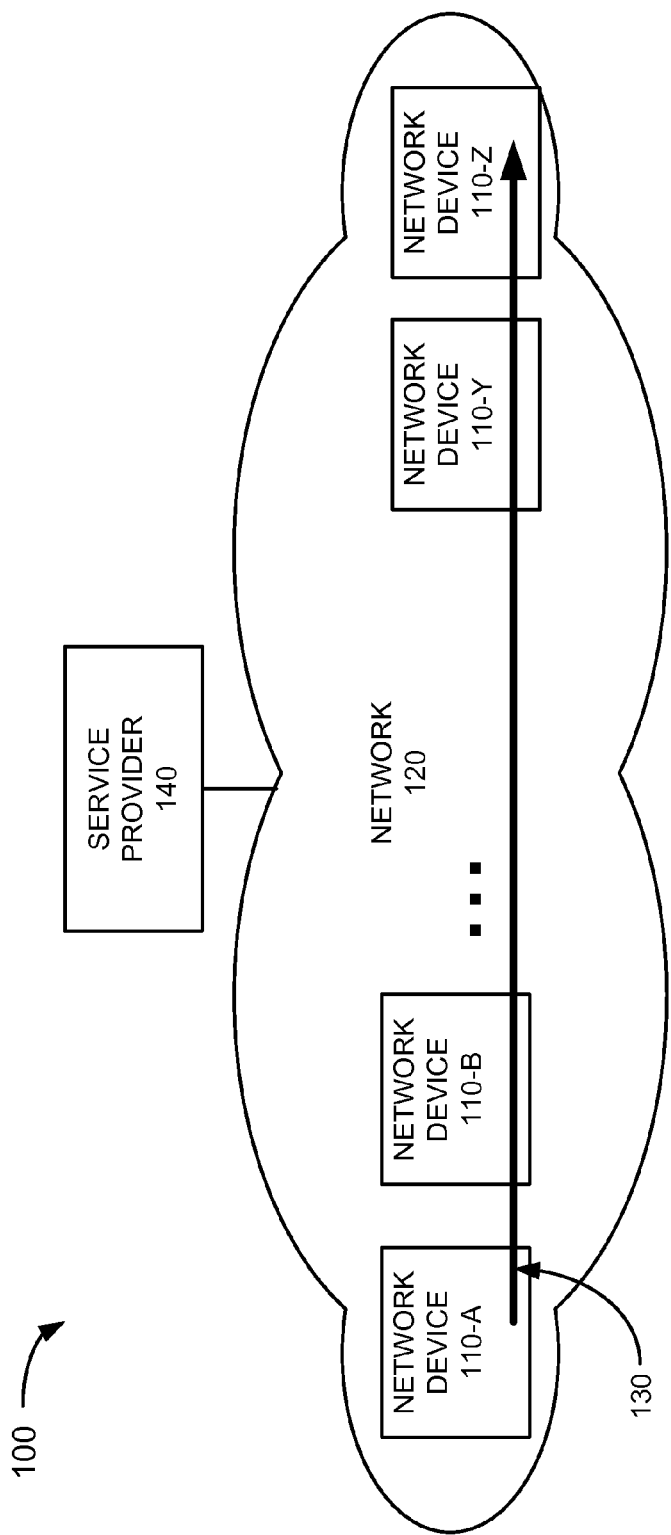
FIG. 1 illustrates an exemplary network in which systems and methods described herein may be implemented.

FIG. 1 is a block diagram of an exemplary network 100 in which systems and methods described herein may be implemented. Network 100 may include a number of network devices 110-A, 110-B, 110-Y and 110-Z, referred to collectively as network devices 110, included in network 120. Network 100 may also include network 120, path 130 (also referred to as LSP 130) and service provider 140.

Each of network devices 110 may include a router, a switch, or another network device capable or routing data. In an exemplary implementation, network devices 110 (also referred to herein as routers 110) may each represent a label switched router (LSR) that is able to route data using MPLS. For example, in one implementation, router 110-A may represent the head end of an LSP, referred to as an ingress LSR, and router 110-Z may represent the tail end of the LSP, referred to as the egress LSR. In this implementation, LSP 130 from router 110-A to router 110-Z may include routers 110-A, 110-B, 110-Y and 120-Z, as indicated by the line connecting network device 110-A to network device 110-Z. LSP 130 may also include additional LSRs (not shown in FIG. 1) that are included in network 120. In other implementations, router 110-A may represent a point in an LSP (e.g., LSP 130) at which a problem has been detected.

Network 120 may include one or more wired, wireless and/or optical networks that are capable of receiving and transmitting data, voice and/or video signals, including multimedia signals that include voice, data and video information. As described above, in an exemplary implementation, network 120 may include a number of LSRs used to route data using MPLS. Network 120 may include additional network devices, such as additional LSRs (not shown in FIG. 1), that may form part of LSP 130 or form part of other LSPs used to route customer traffic via network 120.

LSP 130, as described above, may represent an LSP from router 110-A to router 110-Z or a portion of an LSP that includes the path from router 110-A to router 110-Z.

Service provider 140 may represent an entity associated with monitoring network 120 to ensure that customer traffic is being properly routed. For example, service provider 140 may monitor LSP 130 to ensure that data is being forwarded in accordance with customer requirements. In addition, when a problem occurs in network 120 (e.g., a problem with LSP 130), service provider 140 may troubleshoot and/or re-route traffic, as described in detail below.

The exemplary configuration illustrated in FIG. 1 is provided for simplicity. It should be understood that a typical network may include more or fewer devices than illustrated in FIG. 1. For example, four network devices 110, one network 120, one LSP 130 and one service provider 140 are shown for simplicity. It should be understood that network 100 may include a large number (e.g., hundreds or thousands) of routers and/or LSPs. Network 100 may also include additional elements, such as switches, gateways, backend systems, etc., that aid in routing information in network 100. In addition, although the various devices illustrated in FIG. 1 are shown as separate devices in FIG. 1, in other implementations, the functions performed by two or more of these devices may be performed by a single device or platform. In addition, in some implementations, the functions described as being performed by a particular device may alternatively be performed by a different device.

Figure 2:
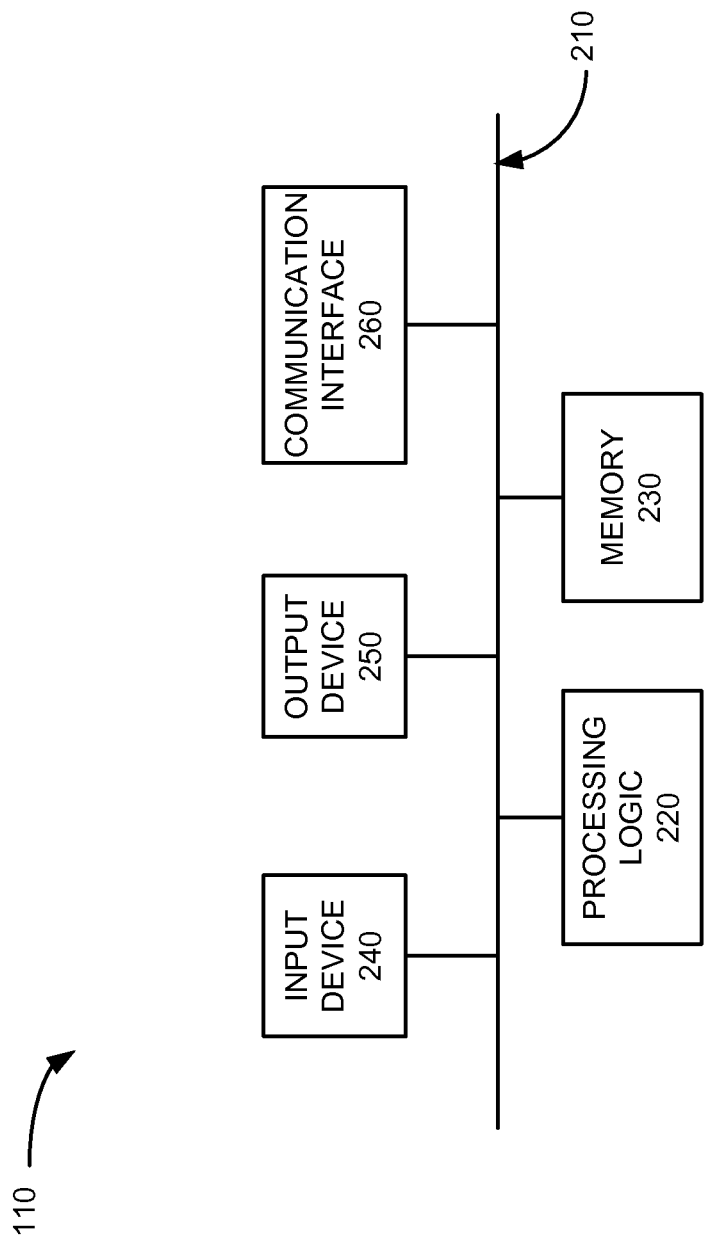
FIG. 2 illustrates an exemplary configuration of one or more of the network devices of FIG. 1.

FIG. 2 illustrates an exemplary configuration of one of routers 110. Referring to FIG. 2, router 110 may include a bus 210, processing logic 220, a memory 230, an input device 240, an output device 250 and a communication interface 260. Bus 210 may include a path that permits communication among the elements of router 110.

Processing logic 220 may include one or more processors, microprocessors, application specific integrated circuits (ASICs), field programmable gate arrays (FPGAs), or other processing logic that may interpret and execute instructions in, for example, both the data and control planes of router 110.

Memory 230 may include a random access memory (RAM) or another type of dynamic storage device that may store information and instructions for execution by processing logic 220. Memory 230 may also include a read only memory (ROM) device or another type of static storage device that may store static information and instructions for use by processing logic 220. Memory 230 may further include a solid state drive (SDD). Memory 230 may also include a magnetic and/or optical recording medium (e.g., a hard disk) and its corresponding drive.

Input device 240 may include a mechanism that permits a user to input information to router 110. Output device 250 may include a mechanism that outputs information to the user.

Communication interface 260 may include any transceiver-like mechanism (e.g., line cards) that router 110 may use to communicate with other devices (e.g., other routers 110, service provider 140, etc.). For example, communication interface 260 associated with router 110-A may include mechanisms for communicating with service provider 140 when a problem occurs in LSP 130 via wired, wireless or optical mechanisms. Communication interface 260 may also include a modem or an Ethernet interface to a LAN or other mechanisms for communicating with other devices/systems.

The exemplary configuration illustrated in FIG. 2 is provided for simplicity. It should be understood that router 110 may include more or fewer devices than illustrated in FIG. 2. For example, router 110 may include routing and forwarding logic (e.g., hard-wired circuitry or logic), routing tables, forwarding tables, etc., associated with routing data in network 120.

In an exemplary implementation, router 110 may perform operations in response to processing logic 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

FIG. 3 is an exemplary functional block diagram of router 110-A according to an exemplary implementation. The other routers 110 illustrated in FIG. 1 may be configured in a similar manner. The logical blocks illustrated in FIG. 3 may be implemented in software, hardware, or a combination of hardware and software. For example, in one implementation, all or some of the logical blocks illustrated in FIG. 3 may be implemented in, for example, a control plane of router 110 by processing logic 220 (FIG. 2) executing software instructions stored in, for example, memory 230.

Referring to FIG. 3, router 110 may include path discovery logic 310, path metric logic 320, open shortest path first (OSPF) database 330, output logic 340 and stack memory 350. Path discovery logic 310 may include logic that identifies a path from an ingress router to an egress router. For example, when a problem is discovered by service provider 140 with an LSP in network 120, such as LSP 130, path discovery logic 310 may execute a script or program that causes router 110 to initiate the identification of an alternate path from the ingress router to the egress router, as described in more detail below.

Path metric logic 320 may include logic that identifies an appropriate alternative path in network 120 based on particular rules or metrics associated with the path. In an exemplary implementation, path metric logic 320 may store information identifying a maximum number of hops permitted in an LSP. This information regarding the number of hops may be pre-configured by a network engineer associated with service provider 140. The network engineer may also modify the maximum number of hops based on the particular path and/or trouble shooting scenario. Path metric logic 320 may also identify an appropriate LSP based on stored metric information, such as cost information associated with forwarding data via that path. In other implementations, the path metric used to select a path may involve the sum of the physical distances between each of the LSRs in the LSP, or the amount of time for a packet to be transmitted from the head end of an LSP to a tail end of the LSP. In still other alternative implementations, path metric logic 320 may select a path based on a combination of cost, distance and/or time/latency information associated with transmitting data via the LSP. In each case, path metric logic 320 may select an appropriate LSP based on the particular metric or combination of metrics, as described in detail below OSPF database 330 may be stored in memory 230 and may include information associated with the topology of network 120. For example, OSPF database 330 may store information identifying advertising routers (ARs) in network 120. OSPF database 330 may also store metric information associated with forwarding data between the advertising routers. For example, OSPF database 330 may store cost, distance, time and/or latency information associated with forwarding data between advertising routers in an LSP. Path discovery logic 310 may use this information to identify alternative LSPs in network 120, as described in detail below.

Output logic 340 may include logic used to output information associated with potential paths in network 120. For example, output logic 340 may output information stored in stack memory 350 via output device 250. A network engineer or other personnel may then receive and/or view the information and make a decision regarding an alternate path on which to route data in network 120.

Stack memory 350 may be included in memory 230 and may include one or more buffers or memories that store information identifying potential paths in network 120 identified by path discovery logic 310. For example, path discovery logic 310 may store path information identifying each hop for an LSP in stack memory 350, as described in detail below.

The exemplary configuration illustrated in FIG. 3 is provided for simplicity. It should be understood that router 110 may include more or fewer devices than illustrated in FIG. 3. Router 110, as described briefly above, may include routing/forwarding logic that determines forwarding information based on label information attached to data packets. Router 110, as described in detail below, may also execute a script or program to identify potential alternate paths via which to route data in network 120. The script may be downloaded or forwarded to router 110 when, for example, service provider 140 detects a problem in an LSP. Alternatively, each of routers 110 may store the script that may be invoked by router 110, service provider 140 (e.g., a network engineer associated with service provider 140), or another party when a problem occurs. In each case, router 110 may automatically identify alternative paths when a problem occurs, as described in detail below.

Figure 4A:
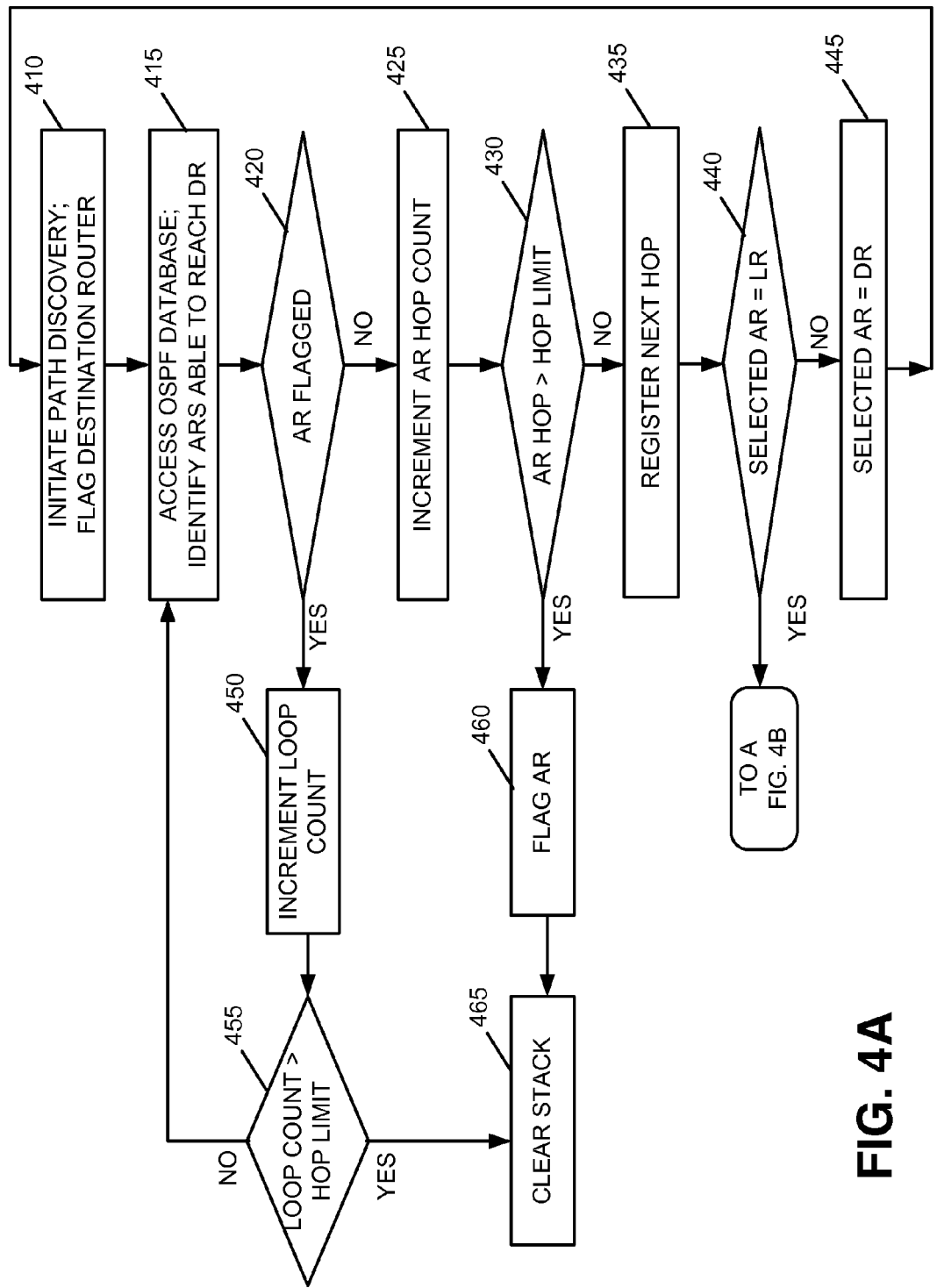
FIGS. 4A and 4B are flow diagrams illustrating exemplary processing associated with the components of FIG. 3.
Figure 4B:
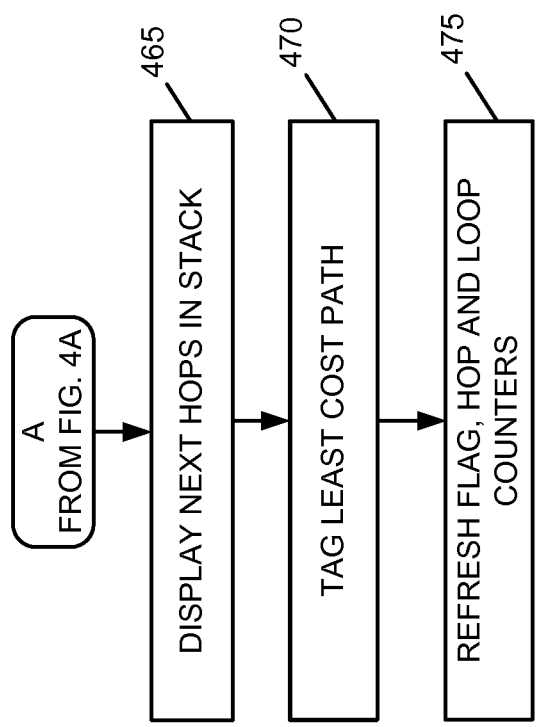

FIGS. 4A and 4B are flow diagrams illustrating exemplary processing associated with network 100. In this example, assume that service provider 140 is trouble shooting a problem with LSP 130. Service provider 140 may download a script or program described above with respect to FIG. 3 to one of routers 110 in LSP 130. Alternatively, service provider 140 (e.g., a network engineer associated with service provider 140) may send a signal, such as a command line interface (CLI) command, to one of routers 110 to launch the script stored in memory 230 of one of routers 110 to identify a path from that router to a particular destination router. In this example, assume that router 110-A stores the script/program associated with identifying an alternative path in network 100 and that the CLI command from service provider 140 requests that a path from the local router (e.g., router 110-A in this example) to destination router 110-Z (referred to as router Z in this example) is to be identified.

Processing may begin by router 110-A executing or launching the script to initiate path discovery (act 410). Path discovery logic 310 may flag a destination router for the desired path (act 410). For example, in this case, the script may identify router Z as the destination router and path discovery logic 310 may flag router Z as the destination router (DR).

Path discovery logic 310 may access OSPF database 330 to identify a path from router A (e.g., the source router, also referred to as the local router) to router Z (e.g., the DR) (act 415). For example, OSPF database 330 may store information identifying advertising routers and topology information associated with ARs. As an example, OSPF database 330 may store information identifying routers in network 120 that may be located a number of hops away from router A. Path discovery logic 310 may use this information to identify the topology of network 120. That is, path discovery logic 310 may use the information in OSPF database 330 to identify routers that are able to access other routers from destination router Z back to local router A. In this example, path discovery logic 310 may identify advertising routers (ARs) that are able to reach router Z (act 415).

Figure 5:
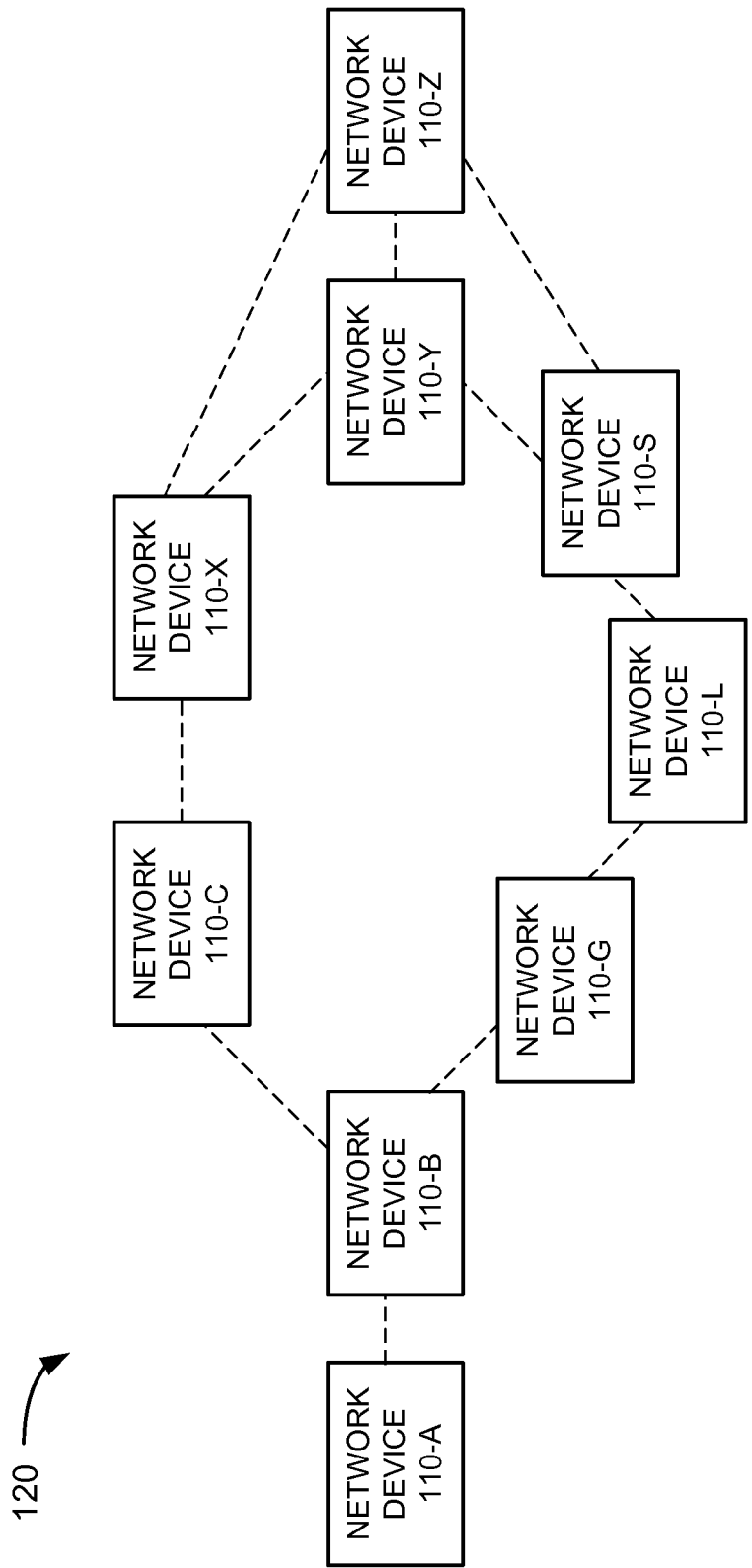
FIG. 5 illustrates an exemplary portion of the network of FIG. 1 associated with the processing of FIGS. 4A and 4B.

As an example, FIG. 5 illustrates a portion of network 120. In this example, assume that routers 110-S, 110-X and 110-Y are able to reach router Z, as indicated by the dotted lines in FIG. 5. In this example, routers 110-S, 110-X and 110-Y may all represent ARs or neighboring routers that are located one hop away from router 110-Z.

Continuing with this example, path discovery logic 310 may identify router 110-X as an AR that is able to reach destination router Z. Path discovery logic 310 may then determine whether the advertising router (i.e., router 110-X in this example) has been flagged (act 420). That is, in this example, path discovery logic 310 may determine whether router 110-X has been flagged as the destination router. If the advertising router has not been flagged (act 420—no), path discovery logic 310 may increment the advertising router hop count (act 425). Flagging the destination router may prevent path discovery logic 310 from looking up information with the same destination router multiple times.

Path metric logic 320 may then determine whether the advertising router hop count is greater than a pre-set hop count limit (act 430). The hop count limit, as described above, may be used to ensure that an alternative LSP does not exceed the pre-set hop count limit. If the hop count is not greater than the hop count limit, path discovery logic 310 may register or store the selected next hop (act 435). Continuing with this example, path discovery logic 310 may register or store information identifying router X as the next hop from router Z in stack memory 350.

Path discovery logic 310 may then determine whether the selected advertising router is the local router (act 440). For example, the local router (LR) may correspond to the router that launched the link path discovery script. Continuing with this example, router A is the local router. If the selected advertising router (e.g., router 110-X in this example) is not the advertising router, path discovery logic 310 may set the selected advertising router as the destination router (act 445). That is, router 110-X in this example is set as the new destination router. Processing may then return to act 410 and router 110-X is flagged as the new destination router. In this manner, path discovery logic 310 may trace back from router 110-Z to router 110-A to attempt to identify an alternative LSP from router A to router Z.

Returning to act 420, if the advertising router has been flagged (act 420—yes), path metric logic 320 may increment the loop count (act 450). Path metric logic 320 may then determine whether the loop count is greater than the hop limit (act 455). The loop count may be used to ensure that path discovery logic 310 does not get stuck in a loop with respect to attempting to identifying a path to router Z. If the loop count is greater than the hop limit, (act 455—yes), path discovery logic 310 may clear the stack associated with this potential path in stack memory 350 (act 465). Processing may then end with respect to this potential path. This may indicate that an appropriate alternative LSP could not be identified for the path that included the advertising router flagged at act 420.

Returning to act 430, if path metric logic 320 determines that the advertising router hop count is greater than the hop limit (act 430—yes), path discovery logic 310 may flag the advertising router (act 460). Path discovery logic 310 may also clear the stack (act 465). Similar to the processing described above, if the hop count is greater than the hop limit, this may indicate that the path is not an appropriate LSP.

Figure 6:
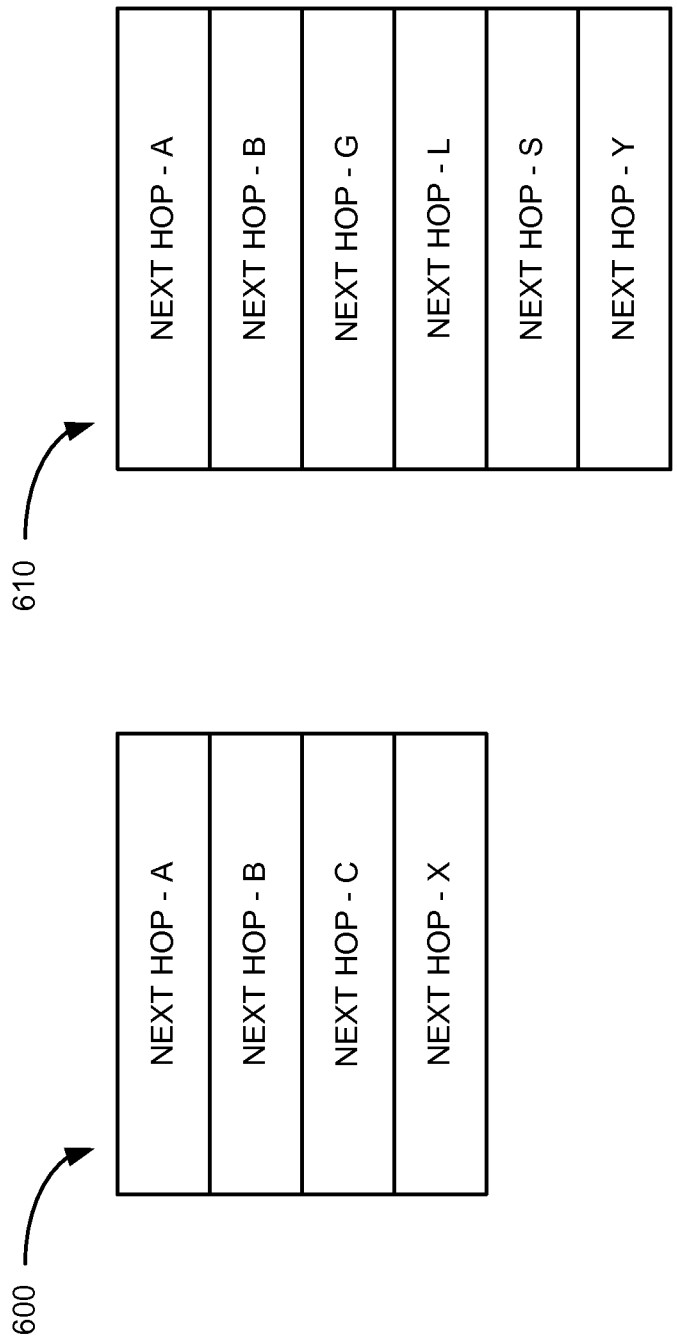
FIG. 6 illustrates an exemplary portion of the memory of FIG. 3 associated with the processing of FIGS. 4A and 4B.

Returning to act 440, if path discovery logic 310 determines that the selected advertising router is the local router (e.g., router A in this example) (act 440—yes), path discovery logic 310 may display the information identifying the hops in stack memory 350 (FIG. 4B—act 465). For example, output logic 340 may output stack 600 illustrated in FIG. 6. As illustrated, stack 600 may illustrate the routers from local router A to destination router Z that are available to route data. In this example, stack 600 displays information identifying routers A, B, C, and X as being routers in a possible alternative path from router A to router Z.

Path discovery logic 310 may perform similar processing associated with each of the advertising routers able to access destination router Z. That is, for each advertising router 110 identified at act 415 as being able to reach destination router Z, path discovery logic 310 may follow the processing described above to attempt to find a path to local router A.

Path metric logic 320 may also display stacks identifying the routers in these paths that are available from router A to router Z. For example, stack 610 may illustrate another route from router A to destination router Z that is available to route data. In this example, stack 610 displays information identifying routers A, B, G, L, S and Y as being routers in a possible alternative path from router A to router Z.

Path metric logic 320 may then tag the least cost path (act 470). For example, as described above, OSPF database 330 may store path metric information indicating a cost associated with forwarding data from a particular router to a next hop router. In implementations in which router 110-A is configured to include an LDP IGP synchronization feature, paths or interfaces for routers that are experiencing problems or are dysfunctional (e.g., have LDP problems) may be assigned a high metric value. This may prevent path metric logic 320 from selecting a path that may be prone to problems.

In each case, path metric logic 320 may calculate the cost for each identified stack (e.g., stacks 600 and 610) stored in memory 350. That is, path metric logic 320 may identify the information from OSPF database 330 indicating the cost associated with each hop in the path. Path metric logic 320 may then select the least cost path.

Path metric logic 320 may also forward information identifying the least cost path to output logic 340. Output logic 340 may then output information identifying the least cost path. For example, output logic 340 may forward the least cost path information to service provider 140 via communication interface 260. In this manner, router 110-A may automatically identify a least cost path in network 120 on which to route data when a problem with an LSP occurs and service personnel associated with service provider 140 may be able to view the least cost path information. As an example, output logic 340 may output information indicating that a path from router A to router Z includes routers A, B, C, X and Z, has a link cost of 1500 and a hop count of 5. Output logic 340 may also indicate whether the LSP that includes routers A, B, C, X and Z is active. Output logic 340 may forward this information to service provider 140 via communication interface 260. The information may then be displayed to personnel (e.g., a network engineer) associated with service provider 140. In situations in which two or more LSPs have an equal cost, output logic 340 may forward information for the multiple LSPs to service provider 140.

After all the potential paths that meet the pre-determined hop limit are identified, path discovery logic 310 may reset the flags (e.g., flagged routers), hop counter and loop counter values (act 475). Path discovery logic 310 may then be able to process another request associated with identifying paths in network 120.

Implementations described herein provide for automatically identifying one or more paths in a network. This may allow for efficient troubleshooting of a problem by a service provider, as well as quick re-routing of customer traffic.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, in the implementations described above, identifying one or more paths in network 120 was described as being performed in response to a detection of a problem in a path. In other implementations, the processing described above may be used by a service provider at any time to select or change paths associated with routing customer traffic to more efficiently transmit data. That is, a service provider may perform the processing described above when provisioning a circuit/path for a customer.

In addition, in some implementations, router 110 and/or service provider 140 may automatically switch customer traffic when an alternative path is identified. For example, if a problem on LSP 130 is identified, router 110 may automatically identify an alternative path as described above, and may automatically switch customer traffic to the alternative path.

Still further, features have been mainly described above as selecting a path based on cost information. In other implementations, other metrics may be used to select the appropriate path, such as a distance metric, time metric and/or latency metric. In each case, the path discovery script or algorithm may automatically select the appropriate path based on the particular metric.

In addition, while series of acts have been described with respect to FIGS. 4A and 4B, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   identifying, by a first router, a plurality of label switched paths from the first router to a destination router, wherein each of the label switched paths includes less than a predetermined number of routers and each of the routers routes data via multiprotocol label switching, wherein the predetermined number of routers is set by a user, and wherein the identifying a first one of the plurality of label switched paths comprises:
      accessing a first database stored in the first router;
   storing, for each of the plurality of label switched paths, information identifying each router in the label switched path;
   outputting, for display, information identifying each of the plurality of label switched paths; and
   identifying a least cost one of the plurality of label switched paths based on the stored information,
   wherein the accessing the first database comprises:
      identifying a plurality of advertising routers capable of accessing the destination router.

2. The method of claim 1, wherein the accessing the first database further comprises:
   identifying a first advertising router capable of accessing the destination router;
   identifying a second advertising router capable of accessing the first advertising router; and
   identifying additional advertising routers in a hop by hop manner until the first router is identified.

3. The method of claim 2, wherein the identifying a first one of the plurality of label switched paths further comprises:
   incrementing a hop count after identifying the first advertising router, and
   setting, after identifying the first advertising router, the first advertising router as a new destination router.

4. The method of claim 3, wherein the identifying a first one of the plurality of label switched paths further comprises:
 determining whether the second advertising router has been flagged, and
 incrementing a loop count in response to determining that the second advertising router has been flagged.

5. The method of claim 3, wherein the identifying a first one of the plurality of label switched paths further comprises:
 determining, after each advertising router is identified, whether the hop count associated with the identified advertising routers is greater than a hop limit.

6. The method of claim 5, wherein the identifying a first one of the plurality of label switched paths further comprises:
 discarding information identifying the first label switched path as one of the plurality of label switched paths, in response to determining that the hop count is greater than the hop limit.

7. The method of claim 1, further comprising:
 identifying cost information associated with each of the plurality of label switched paths based on information stored in the first database; and
 outputting information identifying the least cost one of the plurality of label switched paths based on the cost information.

8. The method of claim 1, wherein the outputting information comprises:
 outputting information identifying each router in each of the label switched paths, a cost associated with each of the label switched paths and a hop count associated with each of the label switched paths.

9. The method of claim 1, further comprising:
 receiving an instruction from a service provider located remotely from the first router; and
 initiating the identifying the plurality of label switched paths based on receipt of the instruction.

10. The method of claim 1, wherein the method is implemented as computer-executable instructions embodied on a computer-readable memory device.

11. The method of claim 1, further comprising:
 receiving a command from a service provider, the command identifying the destination router; and
 initiating the identifying of the plurality of label switched paths in response to the command.

12. A network device, comprising:
 a memory configured to store a first database;
 an output device; and
 logic configured to:
  access the memory,
  identify a plurality of label switched paths from the network device to a destination network device, wherein when identifying the plurality of label switched paths, the logic is configured to:
   identify at least one advertising network device capable of accessing the destination network device, and
   identify additional advertising network devices in a hop by hop manner from the at least one advertising network device until the network device is identified,
  identify a first one of the plurality of label switched paths based on metric information stored in the first database, and
  output information identifying the first label switched path via the output device,
 wherein when identifying at least one advertising network device, the logic is configured to:
  identify a plurality of advertising network devices capable of accessing the destination network device, the network device further comprising:
 a communication interface configured to receive a command from a service provider, the command identifying the destination network device,
 wherein the logic is further configured to:
  initiate identification of the plurality of label switched paths in response to the command.

13. The network device of claim 12, wherein the metric information comprises cost information, and wherein the logic is further configured to:
 access the memory to identify cost information, and
 select one of the plurality of label switched paths having a lowest cost.

14. The network device of claim 12, wherein when identifying a first one of the label switched paths, the logic is configured to:
 identify cost information associated with each of the plurality of label switched paths, and
 select the first label switched path based on the cost information.

15. The network device of claim 12, wherein when outputting information, the logic is further configured to:
 output information identifying each of the network devices in the first label switched path via the output device.

16. The network device of claim 15, wherein the network device comprises a a label switched router.

17. The network device of claim 12, wherein the network device is configured to route data via multiprotocol label switching.

18. A non-transitory computer-readable medium having stored thereon sequences of instructions which, when executed by at least one processor, cause the at least one processor to:
 access a first database;
 identify a plurality of label switched paths from a first router to a destination router, wherein when identifying a plurality of label switched paths, the instructions cause the at least one processor to:
  identify a plurality of routers capable of accessing the destination router;
 identify a first one of the plurality of label switched paths based on metric information stored in the first database; and
 output information identifying each router in the first label switched path, a link cost associated with the first label switched path and an indication whether the first label switched path is active,
 wherein when accessing the first database, the instructions cause the at least one processor to:
  identify a first advertising router capable of accessing the destination router,
  identify a second advertising router capable of accessing the first advertising router, and
  identify additional advertising routers in a hop by hop manner until the first router is identified,
 wherein when identifying a first one of the plurality of label switched paths, the instructions cause the at least one processor to:
  increment a hop count after identifying the first advertising router,
  set, after identifying the first advertising router, the first advertising router as a new destination route,
  determine, after each advertising router is identified, whether the hop count associated with the identified advertising routers is greater than a hop limit.

19. The non-transitory computer-readable medium of claim 18, wherein when identifying the first label switched path, the instructions cause the at least one processor to:
  identify cost information associated with each of the label switched paths; and
  select the first label switched path, wherein the first label switched path has a lowest associated cost.

20. The non-transitory computer-readable medium of claim 18, further comprising instructions for causing the at least one processor to:
  initiate the identifying of the plurality of label switched paths in response to a command from a service provider.

* * * * *